United States Patent
Rusta-Sallehy et al.

(10) Patent No.: US 6,946,104 B2
(45) Date of Patent: *Sep. 20, 2005

(54) CHEMICAL HYDRIDE HYDROGEN GENERATION SYSTEM AND AN ENERGY SYSTEM INCORPORATING THE SAME

(75) Inventors: Ali Rusta-Sallehy, Richmond Hill (CA); David Frank, Scarborough (CA); Robert Rady-Pentek, Richmond Hill (CA)

(73) Assignee: Hydrogenics Corporation, Mississauga (CA)

( * ) Notice: Subject to any disclaimer, the term of this patent is extended or adjusted under 35 U.S.C. 154(b) by 602 days.

This patent is subject to a terminal disclaimer.

(21) Appl. No.: 09/900,469

(22) Filed: Jul. 9, 2001

(65) Prior Publication Data

US 2003/0014917 A1 Jan. 23, 2003

(51) Int. Cl.⁷ .............................. B01J 8/00; H01M 8/04
(52) U.S. Cl. ...................... 422/198; 422/211; 422/234; 422/110; 429/19
(58) Field of Search ................................. 422/107, 110, 422/111, 112, 198, 211, 222, 234, 235; 429/17, 19, 20; 423/657, 658.2

(56) References Cited

U.S. PATENT DOCUMENTS

| | | | |
|---|---|---|---|
| 3,459,510 A | | 8/1969 | Litz et al. |
| 3,511,710 A | * | 5/1970 | Jung et al. .................... 429/15 |
| 3,594,557 A | * | 7/1971 | Anderson .................... 700/72 |
| 5,372,617 A | | 12/1994 | Kerrebrock et al. ........... 48/61 |

(Continued)

FOREIGN PATENT DOCUMENTS

| | | | |
|---|---|---|---|
| EP | 1170249 A1 | 1/2002 | |
| JP | 2002154803 | 5/2002 | |
| WO | 01/51410 | 7/2001 | ............. C01B/3/06 |
| WO | WO 02/066369 | 8/2002 | |

OTHER PUBLICATIONS

Amendola, S.C., et al., "An Ultrasafe Hydrogen Generator: Aqueous, Alkaline Borohydride Solutions and Ru Catalyst", Preprints of Symposium–American Chemical Society, Division of Fuel Chemistry, American Chemical Society, vol. 44, No. 4, 1999, pp. 864–868.

Seifritz, W., "Letter to the Editor", International Journal of Hydrogen Energy, vol. 26, No. 4, Apr. 2001, p. 403, Elsevier Science Publishers B.V., Barking, GB.

Aiello, R., Matthews M.A., Reger, D.L., and Collins, J.E., "Production of Hydrogen Gas From Novel Chemical Hydrides" International Association for Hydrogen Energy Elsevier Science Ltd., pp. 1103–1108, 1998.

Amendola, Steven C., Sharp–Goldman, Stefanie, L., Janjua, M. Saleem, Spencer, Nicole C., Kelly, Michael T., Petillo, Phillip J., and Binder, Michael, "A safe, portable, hydrogen gas generator using aqueous borohydride solution and Ru catalyst", International Journal of Hydrogen Energy, pp. 969–975, 2000.

*Primary Examiner*—Kevin P. Kerns
(74) *Attorney, Agent, or Firm*—Bereskin & Parr

(57) ABSTRACT

A chemical hydride hydrogen generation system and an energy system incorporating the same are provided. The hydrogen generation system comprises: a storage tank for storing a chemical hydride solution; a reactor containing a catalyst; a pump for supplying the chemical hydride solution from the said storage means to the reactor so that the chemical hydride solution reacts to generate hydrogen in the presence of the catalyst; and a second supply line for continuously supplying the solvent of the solution to the chemical hydride solution during the reaction. The energy system comprises the hydrogen generation system, a fuel cell for generating electricity and water from hydrogen and an oxidant, and a separator for recovering the water generated in the fuel cell and supplying the water to the chemical hydride solution during the reaction.

22 Claims, 6 Drawing Sheets

U.S. PATENT DOCUMENTS

| | | |
|---|---|---|
| 5,804,329 A | 9/1998 | Amendola ................... 429/34 |
| 6,143,359 A | 11/2000 | Rendina |
| 6,195,999 B1 | 3/2001 | Arnold et al. |
| 6,228,338 B1 | 5/2001 | Petrie et al. |
| 6,534,033 B1 * | 3/2003 | Amendola et al. ....... 423/648.1 |
| 6,544,400 B2 * | 4/2003 | Hockaday et al. .......... 205/338 |
| 6,592,741 B2 * | 7/2003 | Nakanishi et al. .......... 205/343 |
| 6,645,651 B2 * | 11/2003 | Hockaday et al. ............ 429/19 |
| 6,727,012 B2 * | 4/2004 | Chen et al. ................... 429/17 |
| 6,737,184 B2 * | 5/2004 | Rusta-Sellehy et al. ....... 429/17 |
| 2001/0038821 A1 | 11/2001 | Petrie et al. |
| 2002/0025462 A1 | 2/2002 | Nakanishi et al. |
| 2002/0182459 A1 | 12/2002 | Hockaday et al. |
| 2003/0014917 A1 | 1/2003 | Rusta-Sallehy et al. |
| 2003/0091876 A1 * | 5/2003 | Rusta-Sellehy et al. |
| 2003/0091877 A1 | 5/2003 | Chen et al. |
| 2003/0118504 A1 * | 6/2003 | Mazza et al. |

* cited by examiner

CHEMICAL HYDRIDE HYDROGEN GENERATION SYSTEM AND AN ENERGY SYSTEM INCORPORATING THE SAME

FIELD OF INVENTION

This invention relates to a hydrogen generation system and more particularly relates to a chemical hydride hydrogen generation system in combination with a fuel cell system.

BACKGROUND TECHNOLOGY

Hydrogen has been recognized as an environmentally friendly clean fuel of the future since it has various applications in power generation systems. For example, hydrogen can be used as a fuel for fuel cells, especially proton exchange membrane fuel cells, which use hydrogen and air to produce electricity, generating only water as a by-product. Fuel cells are being developed to replace traditional electricity generators because they produce clean, environmentally friendly energy. However, these fuel cells require external supply and storage devices for hydrogen. Extensive efforts have been made to develop a safe and efficient way to store hydrogen, especially in mobile applications. Conventional hydrogen storage technologies include liquid hydrogen, compressed gas cylinders, dehydrogenation of compounds, chemical adsorption into metal alloys and chemical storage as hydrides. However, each of these systems is either hazardous or bulky.

Another method of storing hydrogen has been proposed recently. This method uses a classical chemical hydride, such as $NaBH_4$, as a hydrogen storage medium. The principle of this method is the reaction of the chemical hydride with water in the presence of a catalyst to generate hydrogen, as shown in the equation below:

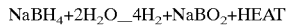

$$NaBH_4 + 2H_2O \rightarrow 4H_2 + NaBO_2 + HEAT$$

The borohydride, $NaBH_4$, acts as both the hydrogen carrier and the storage medium. Ruthenium, Cobalt, Platinum or alloys thereof can be used as a catalyst in this reaction. It is to be noted that this reaction occurs without a catalyst in an acidic environment and only slightly under alkali conditions. This means the chemical hydride solution can be stored and has a shelf life under alkali conditions. This reaction is efficient on a weight basis since half of the hydrogen produced comes from $NaBH_4$ and the other half comes from $H_2O$. Borohydride is a relatively cheap material, usually used in wastewater processing, pharmaceutical synthesis, etc. Borohydride is also easier and safer to handle and transport than highly pressurized hydrogen or cryogenic hydrogen. As a result, there are some advantages to use borohydride as a method of storing hydrogen as a fuel for fuel cells.

There are several known examples of hydrogen generation systems that utilize chemical hydrides. One type of hydrogen generation system comprises a closed vessel for containing chemical hydride and a mechanical stirring mechanism disposed within the vessel for stirring the chemical hydride within the vessel. Water is injected into the vessel to react with chemical hydride and generated hydrogen is removed from the vessel through an outlet. The stirring mechanism means is used to ensure sufficient contact between the hydride and water while preventing the clumping of the hydride. Since the hydride is in solid phase in this system, the stirring mechanism is indispensable. However, in such systems the stirring mechanism consumes energy, increases the overall system weight and reduces system efficiency. Further, the noise generated in the stirring operation is undesirable. In addition, the reaction rate is low, making the fuel unresponsive, useless or very hard to control. The system also tends to be large and cumbersome.

Another type of hydrogen generation system employs a chemical hydride solution. In this system an aqueous chemical hydride solution is introduced to a catalyst bed to generate hydrogen. However, there are a number of problems associated with this liquid phase system. First, the by-product borate, in the above equation, $NaBO_2$ is less soluble then the reactant borohydride, namely $NaBH_4$. Specifically, $NaBO_2$ is only approximately 20% soluble. This means that in order to generate hydrogen in a liquid phased system, and thereby reduce the problems associated with the aforementioned solid phased systems, the concentration of borohydride in the solution can only be about 20% which is much lower than borohydride's solubility in water. Therefore the achievable hydrogen density of the system is considerably limited.

A further deficiency of the aforementioned examples is that neither system is capable of responding in real time to the fuel (hydrogen) needs of the fuel cell. This ability is referred to as load following ability.

SUMMARY OF THE INVENTION

In order to overcome the aforementioned deficiencies associated with the prior art, one aspect of the present invention provides a chemical hydride hydrogen generation system, comprising:

a storage means for storing a chemical hydride solution;

a reactor containing a catalyst;

a first supplying means for supplying the chemical hydride solution from the said storage means to the said reactor so that the chemical hydride solution reacts to generate hydrogen in the presence of the catalyst;

wherein the system further includes a second supplying means for continuously supplying the solvent of the said solution to the chemical hydride solution during the reaction.

The chemical hydride solution can be a borohydride hydride water solution. The solute of the solution can be in the form of $MB_xH_y$, in which M is a metal. Specifically, the solute can be $NaBH_4$, $LiBH_4$, $KBH_4$, $RbH_4$. Alternatively, the solute can be $NH_3BH_3$. Preferably, the chemical hydride solution is a water solution in which the solute is $NaBH_4$ and less than 5% $LiBH_4$. Preferably, to ensure the system works properly under low temperature, the chemical hydride solution further includes a freezing point depressing agent. The freezing point depressing agent is preferably glycerol and concentration of glycerol is no higher than 5%. More preferably, the concentration of glycerol is 1%. The solution preferably further includes alkaline additives. More preferably, the alkaline additive is selected from LiOH, KOH, and NaOH. More preferably, the alkaline additive is 0.1% NaOH.

More preferably, the system further includes a flow control means that operatively stops said first supplying means when the hydrogen pressure in the said reactor reaches a first value and activates the said first supplying means when the hydrogen pressure in the said reactor reaches a second value lower than the first value. More preferably, the system further includes a heat exchanging means for the said reactor that selectively removes heat from the said reactor during normal operation and heats up the said reactor when the system works under low temperature.

According to another aspect of the present invention, an energy system is provided, comprising:
- a fuel cell for generating electricity and water from hydrogen and an oxidant;
- a chemical hydride hydrogen generation system, comprising:
  - a storage means for storing a chemical hydride solution;
  - a reactor containing a catalyst;
  - a first supplying means for supplying the chemical hydride solution from the said storage means to the said reactor so that the chemical hydride solution reacts to generate hydrogen in the presence of the catalyst;
- a means for supplying hydrogen generated in the said reactor to the said fuel cell in a controlled manner; and
- a means for recovering the water generated in the said fuel cell and supplying the said water to the chemical hydride solution during the reaction.

Preferably, the said means for recovering the water generated in the said fuel cell includes a gas-liquid separator. More preferably, the said system further includes a switch means that selectively allows the excess hydrogen leaving the fuel cell after reaction to be circulated back to the said fuel cell in the first mode and allows the hydrogen to be supplied to the said catalytic burner from the said fuel cell in the second mode. More preferably, the said system further includes a first control means that operatively switches the switch means between the first and second modes.

Preferably, the said means for supplying hydrogen generated in the said reactor to the said fuel cell further includes a filtering means between the said reactor and the said fuel cell for purifying the hydrogen generated in the said reactor before the hydrogen is supplied to the fuel cell.

In order to provide the energy system with load following capability, the system further includes a second control means that operatively stops the said first supplying means when the hydrogen pressure in the said reactor reaches a first value and activates the said first supplying means when the hydrogen pressure in the said reactor reaches a second value lower than the first value.

In order to ensure that the energy system works properly under low temperature, the system further includes a heat exchanging means for the said reactor that selectively removes heat from the said reactor during normal operation and heats up the said reactor when the system works under low temperature.

The chemical hydride solution used in the said energy system can be a borohydride water solution. The solute of the solution can be in the form of $MB_xH_y$, in which M is a metal. Specifically, the solute can be $NaBH_4$, $LiBH_4$, $KBH_4$ or $RbH_4$. Alternatively, the solute can be $NH_3BH_3$. Preferably, the chemical hydride solution is a water solution in which the solute is $NaBH_4$ and less than 5% $LiBH_4$. Preferably, to ensure the system works properly under low temperature, the chemical hydride solution further includes a freezing point depressing agent. The freezing point depressing agent is preferably glycerol and concentration of glycerol is no higher than 5%. More preferably, the concentration of glycerol is 1%. The solution preferably further includes alkaline additives. More preferably, the alkaline additive is selected from LiOH, KOH, and NaOH. More preferably, the alkaline additive is 0.1% NaOH.

The chemical hydride hydrogen generation system according to the present invention provides a safe, clean, efficient and reliable hydrogen generation system and an energy system in which the hydrogen generation system and the fuel cell system operate synergistically. The hydrogen generation system is safe in that low pressure hydrogen is generated and used in the fuel cell instead of highly pressurized hydrogen. The system is also environmentally safe in that the reaction products are harmless detergent base chemicals. When novel borohydride solution is used, the system can operate at as low as −22° C. temperature. The pressure control means employed in the system enables the system to follow the load of fuel cell stack as well as meet peak performance requirements. By capturing and recycling the water in the fuel cell exhaust and introducing it into the hydride solution, the system of the present invention further enhances the energy density. Experiments show that the chemical hydride hydrogen generation system according to the present invention has achieved energy densities of 1.2 KWh/L and 0.8 KWh/kg, which is comparable, if not advantageous to fuel cell systems currently available. Hydrogen recycled through a filtration system could also allow for higher system efficiency as well as an increased chemical hydride energy density.

BRIEF DESCRIPTION OF DRAWINGS

For a better understanding of the present invention, and to show more clearly how it may be carried into effect, reference will now be made to the accompanying drawings, which show, by way of example, preferred embodiments of the present invention, and in which.

DETAILED DESCRIPTION OF PREFERRED EMBODIMENTS

The features and advantage of the present invention will become more apparent in the light of the following detailed description of preferred embodiments thereof.

Figure 1:
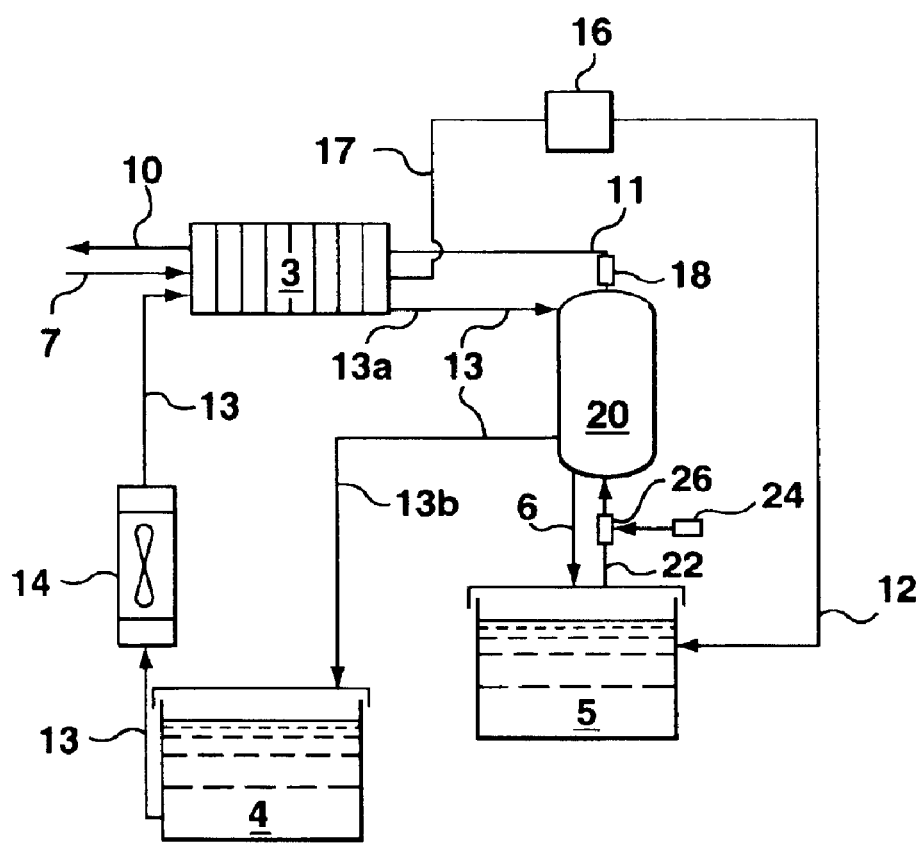
FIG. 1 is a schematic view of the first embodiment of the chemical hydride hydrogen generation system according to the present invention.

Referring to FIG. 1, the chemical hydride power generation system according to the present invention combines a hydrogen generation system and a fuel cell system. The hydrogen generation system includes a chemical hydride storage tank 5 and a reactor 20. The fuel cell includes a fuel cell stack 3 and some peripherals, namely a coolant storage tank 4, a heat exchanger 14 and a gas-liquid separator 16. In this embodiment, the present invention is described by using $NaBH_4$ as an example of the chemical hydride used in the hydrogen generation system.

Chemical hydride is stored in the storage tank 5 in the form of solution. When hydrogen is demanded by the fuel cell stack 3, the hydride is supplied to the reactor 20 through the line 22 by means of a pump 26. The reactor 20 contains a catalyst for the reaction. Therefore, the hydride reacts within the reactor 20 and hydrogen is generated. The generated hydrogen flows out through a hydrogen outlet of the top of the reactor 20 and is supplied to an anode inlet of the fuel cell stack 3 via a hydrogen line 11. As is known in the art, the hydrogen reacts on the anode of the fuel cell stack 3 and the unreacted hydrogen leaves the fuel cell stack 3 through the anode outlet 10 thereof. The unreacted hydride in the form of solution, together with the by-product $NaBO_2$ returns to the storage tank 5 through line 6.

In the fuel cell stack 3, oxidant, typically air is introduced through an air inlet 7 into the cathode of the fuel cell stack 3. As is known to those skilled in the art, the oxygen in the air reacts at the cathode of the fuel cell stack 3 and generates water as a product. The unreacted air leaves the fuel cell stack 3 through the cathode outlet thereof and flows out through a discharged airline 17 as shown in FIG. 1.

As previously mentioned, the by-product of the hydrogen generation reaction, in this embodiment $NaBO_2$, is less soluble then the reactant $NaBH_4$. Specifically, $NaBO_2$ is only approximately 20% soluble. Therefore, as the hydrogen generation reaction continues, the concentration of $NaBO_2$ in the hydride solution stored in the storage tanks increases until it reaches the solubility of the $NaBO_2$. If the reaction continues, $NaBO_2$ in solid phase will occur in the storage tank and may be supplied to the reactor 20, resulting in clogging of the hydrogen generation system. Thus, the reaction degrades and not enough hydrogen will be supplied to the fuel cell stack 3. In conventional systems, in order to prevent this from happening, the initial concentration of the hydride in the solution has to be reduced to as low as 20% which is much lower than the borohydride solubility in water, 40%. Consequently, the achievable hydrogen storage density of the system is considerably limited. In this present invention, this problem is overcome by continuously introducing water into the hydride tank 5. As the hydrogen generation continues, the increase of $NaBO_2$ concentration in the solution is counteracted by the increase of solvent, i.e. water. Therefore, the initial concentration of the hydride can be higher than that is allowed in conventional systems, which results in higher hydrogen density of the system.

Preferably, the operation of continuously introducing water into the hydride tank 5 is achieved by recycling of the water entrapped in the fuel cell exhaust and supplying the water to the hydride solution. As shown in FIG. 1, water is generated on the cathode of the fuel cell stack 3 and is exhausted from the fuel cell stack 3 together with the unreacted air. The exhaust mixture of air and water then flows to a gas-liquid separator 16 in which air and water are separated. Therefore, the water is recovered. The recovered water is then introduced through a recovered water line 12, that provides a delivery means for the water, into the chemical hydride solution in the storage tank 5. As water is a by-product of the fuel cell reaction, the hydrogen generation system utilizes the readily available water in its vicinity, resulting in increased system efficency. Generally, recovery of the exhaust water can enable the initial concentration of the hydride to be increased by at least 60%, as is demonstrated in the following tables.

TABLE 1

Conventional $NaBH_4$ water solution

| Iteration # | $NaBH_4$ (g) | WT % | $H_2O$ (g) | $NaBO_2$ (g) | WT % |
|---|---|---|---|---|---|
| 0.00 | 400.00 | 40.00% | 1000.00 | 0.00 | 0.00% |
| 1.00 | 350.00 | 36.75% | 952.37 | 86.97 | 9.13% |
| 2.00 | 300.00 | 33.16% | 904.73 | 173.94 | 19.23% |
| 3.00 | 250.00 | 29.17% | 857.10 | 260.90 | 30.44% |
| 4.00 | 200.00 | 24.71% | 809.48 | 347.87 | 42.98% |
| 5.00 | 150.00 | 19.69% | 761.83 | 434.84 | 57.08% |
| 6.00 | 100.00 | 14.00% | 714.20 | 521.81 | 73.06% |
| 7.00 | 50.00 | 7.50% | 666.56 | 608.78 | 91.33% |
| 8.00 | 0.00 | 0.00% | 618.93 | 695.74 | 112.41% |

TABLE 2

$NaBH_4$ water solution of the present invention

| Iteration # | $NaBH_4$ (g) | WT % | $H_2O$ (g) | $NaBO_2$ (g) | WT % | Recovered $H_2O$ (g) |
|---|---|---|---|---|---|---|
| 0.00 | 400.00 | 40.00% | 1000.00 | 0.00 | 0.00% | 0.00 |
| 1.00 | 350.00 | 33.41% | 1047.63 | 86.97 | 8.30% | 95.27 |
| 2.00 | 300.00 | 27.39% | 1095.27 | 173.94 | 15.88% | 95.27 |
| 3.00 | 250.00 | 21.87% | 1142.90 | 260.90 | 22.83% | 95.27 |
| 4.00 | 200.00 | 16.80% | 1190.54 | 347.87 | 29.22% | 95.27 |
| 5.00 | 150.00 | 12.11% | 1238.17 | 434.84 | 35.12% | 95.27 |
| 6.00 | 100.00 | 7.78% | 1285.80 | 521.81 | 40.58% | 95.27 |
| 7.00 | 50.00 | 3.75% | 1333.44 | 608.78 | 45.65% | 95.27 |
| 8.00 | 0.00 | 0.00% | 1381.07 | 695.74 | 50.38% | 95.27 |

Table 1 and table 2 respectively show the composition of $NaBH_4$, water and $NaBO_2$ in the solution during hydrogen generation reaction, for a conventional solution and for a solution in accordance with the present invention, in which the water is added as the reaction progresses. The initial concentration of $NaBH_4$ in both tables is 40%, that is to say, 400 g $NaBH_4$ in 1 L water. As the experimental data show, the conventional solution begins to clog when there is 300 g of $NaBH_4$ left in the solution. This is because the concentration of $NaBH_4$ is close to the initial 20% level, and exceeds this when the level of $NaBH_4$ has fallen to 250 g. The solution of the present invention (Table 2) only begins to clog when 250 g of $NaBH_4$ is left in the solution. Again, the table indicates that the critical 20% level for $NaBH_2$ is exceeded just before the amount of $NaBH_4$ falls to 250 g. It is clear that the present invention considerably increases the hydrogen generation capacity of $NaBH_4$4 water solution. The data shows that, by adding exhausted water, one can reduce the concentration of $NaBO_2$ effectively enabling the $NaBH_4$ level to be reduced further before clogging occurs. Table 1 shows, as expected due to utilization of $H_2O$ to generated hydrogen, that the amount of $H_2O$ reduces by over one third at the end of the experiment. Table 2 shows, due to the addition of the exhaust water, that the total volume of water increases to close to 1400 g. and is at 1142.90 grams of at iteration 3. This would require the tank 5 to have a larger volume. However, the initial amount of $NaBH_4$4 is increased by 50 g, that is ⅙ more than that in conventional systems. The increase of water happens only as the reaction continues. In this example, the amount of water is only increased by approximately ⅒, which means the recovery of water still has the effect of increasing the energy density of the overall system.

Since the reaction in the reactor 20 is exothermic, necessary cooling means has to be provided. Generally, cooling tubes can be provided within the reactor 20 in which a cooling fluid flows through. As shown in FIG. 1, in the present invention, the coolant for the hydrogen generation reaction can be water or other commonly used coolants for the fuel cell stack 3. Coolant enters the reactor 20 via a coolant inlet thereof from the coolant line 13$a$, flows through the coolant tubes in the reactor 20 and leaves the reactor 20 via a coolant outlet, taking away the heat generated in the reactor 20. Then the coolant returns to a coolant storage tank 4 by the coolant line 13$b$ and is circulated to the fuel cell stack 3. Generally, a heat exchanger 14 is provided in the coolant line 13 before or after the coolant reaches the fuel cell stack 3 to maintain the coolant at a low temperature. Then the coolant flows through the fuel cell stack 3 and then into the reactor 20 and continues to circulate in the coolant loop. The heat exchanger 14 can in principle be located at any location in the coolant loop.

Figure 3:
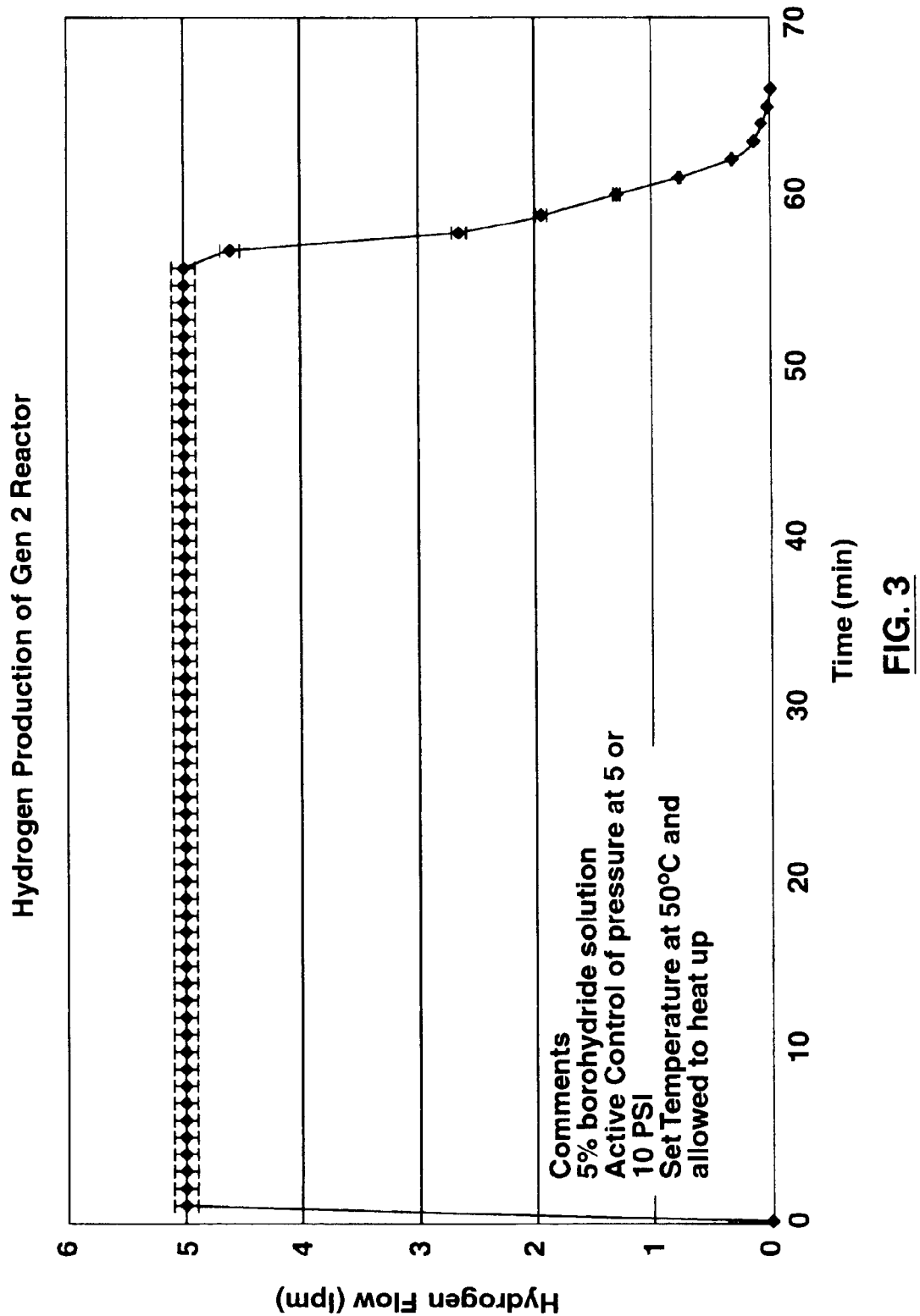
FIG. 3 is a diagram showing the hydrogen flow of the hydrogen generation system according to the present invention during operation.

In operation, the fuel cell stack 3 generates electricity while consuming the hydrogen supplied from the reactor 20. In order to provide the hydrogen generation system with the load following ability, a pressure sensor 18 is provided at the hydrogen outlet of the reactor 20. The pressure sensor 18 is in connection with a switch 24 in hydride supply line 22 and controls the operation of the same, and the switch 24 controls the pump 26 pumping the solution from the tank 5 to the reactor 20. The hydride supply line 22, the switch 24 and the pump 26 together provide a supplying device, while it will be recognized that not all these elements are always essential. As the reaction in the reactor 20 continues, the hydrogen is generated and supplied to the fuel cell stack 3. However, when the fuel cell stack 3 operates in a condition that the hydrogen generation rate in the reactor 20 is more than the hydrogen consumption rate of the fuel cell stack 3, the pressure of hydrogen in the reactor 20 increases until it reaches a certain value when the pressure sensor 18 activates the switch 24 to shut down the pump, and hence cut the hydride supply to the reactor 20. Therefore the reaction in the reactor 20 stops. Then the fuel cell stack 3 continues to consume the hydrogen, resulting in the pressure drop of hydrogen in the reactor 20 until it reaches a certain value when the pressure sensor 18 controls the switch 24 to start the pump 26 and hence the hydride solution is supplied to the reactor 20 and in turn hydrogen is generated to meet the demand of the fuel cell stack 3. Thus the system of the present invention has the capability to follow the load as well as meet peak performance requirements. Additionally, when the fuel cell stack 3 shuts down, the pressure sensor 18 will immediately activate the switch 24 to shut down the pump 26. The reactor 20 preferably has a vent (not shown) so that the hydrogen present in the reactor at the time of shutdown and that generated thereafter can be released, either into the environment or a storage device. Hence the system can shut down completely in a relatively short time. FIG. 3 illustrates the hydrogen flow of the present system during operation at a constant rate, employing the said pressure sensor 18 and the switch 24. As illustrated, the hydrogen flow is stable throughout the operation. It is to be understood that the drop of the hydrogen flow in the curve indicates the process of system shutdown.

Figure 4:
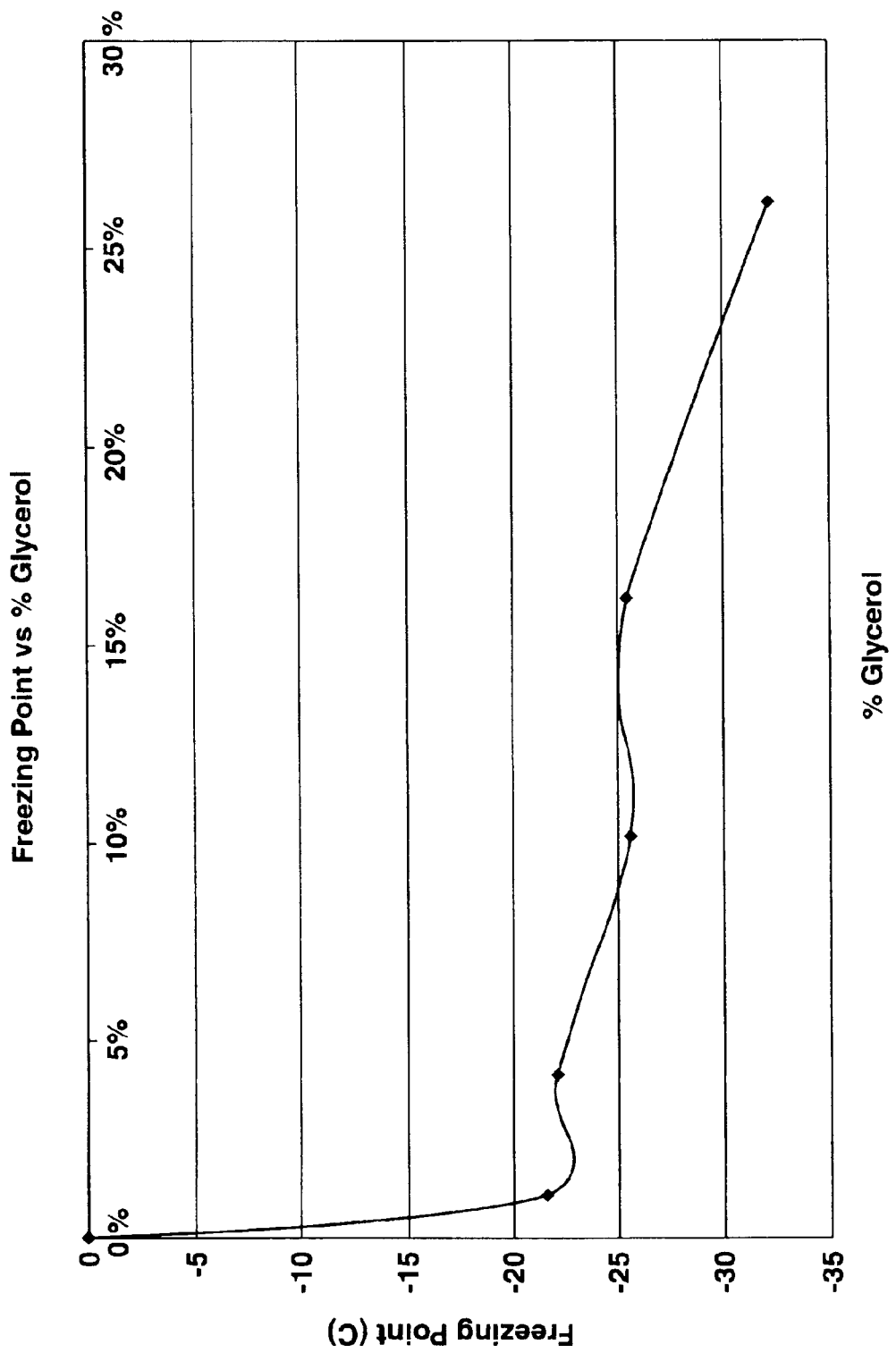
FIG. 4 is a diagram showing the relation of freezing point of the chemical hydride solution according to the present invention with the concentration of freezing point depressing agent in the solution.
Figure 5:
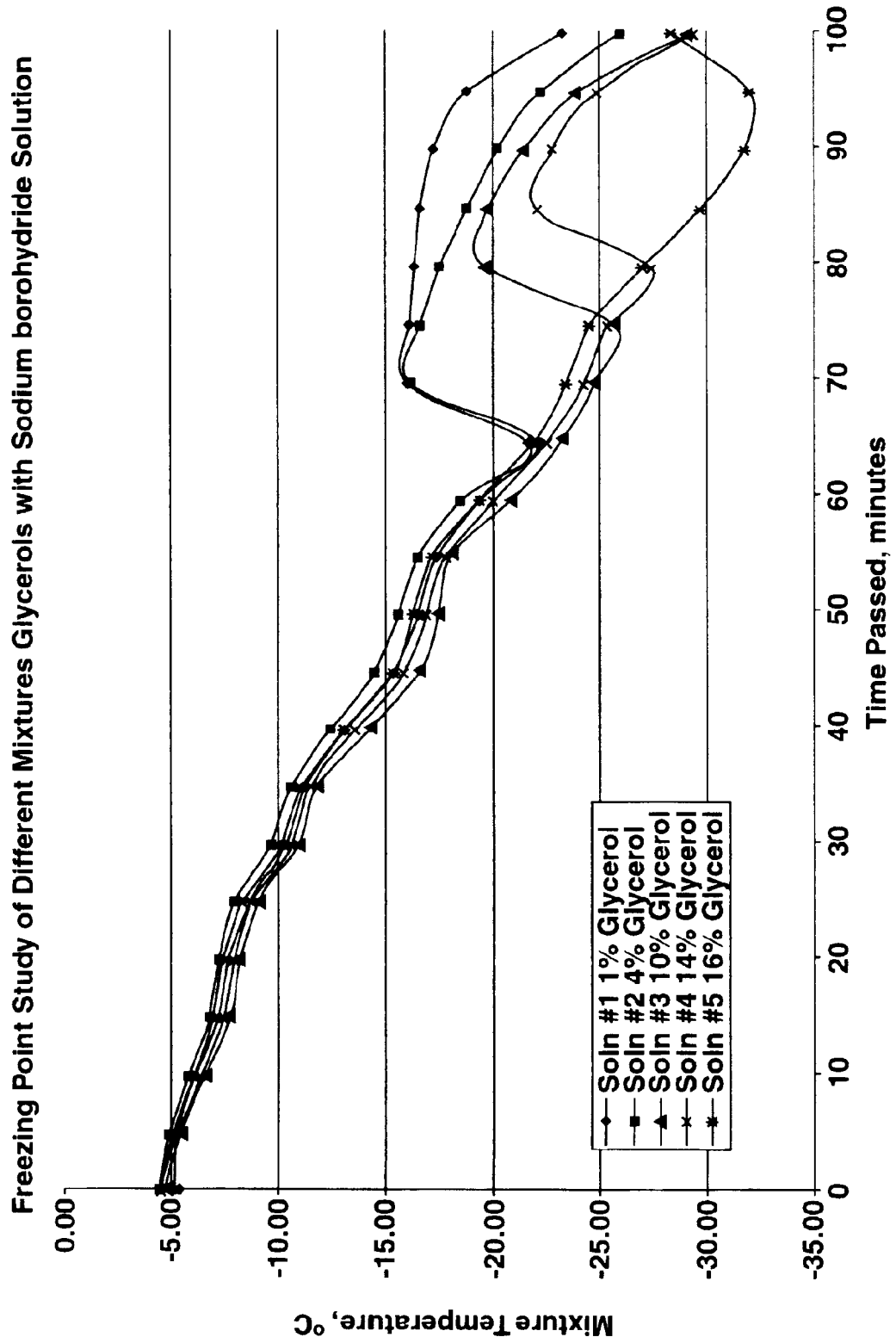
FIG. 5 is a diagram showing the relation of chemical hydride solution temperature according to the present invention with the concentration of freezing point depressing agent in the solution.

In practice, the fuel cell and the hydrogen generation system may work under low temperature. However, borohydride water solution freezes at about 0° C. In the present invention, the solution can be a borohydride water solution with glycerol and sodium hydroxide. As can be seen in FIG. 4, which shows the relation of freezing point of the solution with the concentration of the glycerol, the addition of glycerol considerably lowers the freezing point of the solution. For example, the solution is stable and can still operate at as low as −22° C. with 1% of glycerol. FIG. 5 shows the effects of various concentrations of glycerol on the freezing point of the solution. In FIG. 5, the sudden increase in the solution temperature indicates that the solution starts to freeze since the crystallization process is exothermic. As the concentration of glycerol increases, even lower freezing points can be obtained and an approximately −35° C. freezing point is achieved with 16% glycerol. However, the solubility of the borohydride, hence the hydrogen density of the overall hydrogen generation system decreases with the increase in the concentration of glycerol. Experiments show that the concentration of glycerol is preferably lower than 5% and the best compromise between the freezing point and hydrogen density of the solution is 1% glycerol. 1% of glycerol does not noticeably compromise the borohydride solubility but achieves a freezing point of −22° C.

In order to further ensure that the system works properly under low temperature, the coolant in the present invention can also be used to heat the system. In this situation, another heat exchanger may be added in the coolant line 13 between the fuel cell stack 3 and the reactor 20 so that the coolant can be further heated after it leaves the fuel cell stack 3. The heated coolant in turn heats the reactor 20 to facilitate the hydrogen generation reaction.

Preferably, the chemical hydride solution further includes alkaline additives, such as LiOH, KOH, NaOH to provide an alkaline condition which significantly slows the chemical hydride reaction, thereby lengthening the shelf life of the solution. NaOH is mostly used due to its relatively low mass and cost. A concentration of 0.1% NaOH is adequate in raising the pH enough to stablize the solution.

Figure 6:
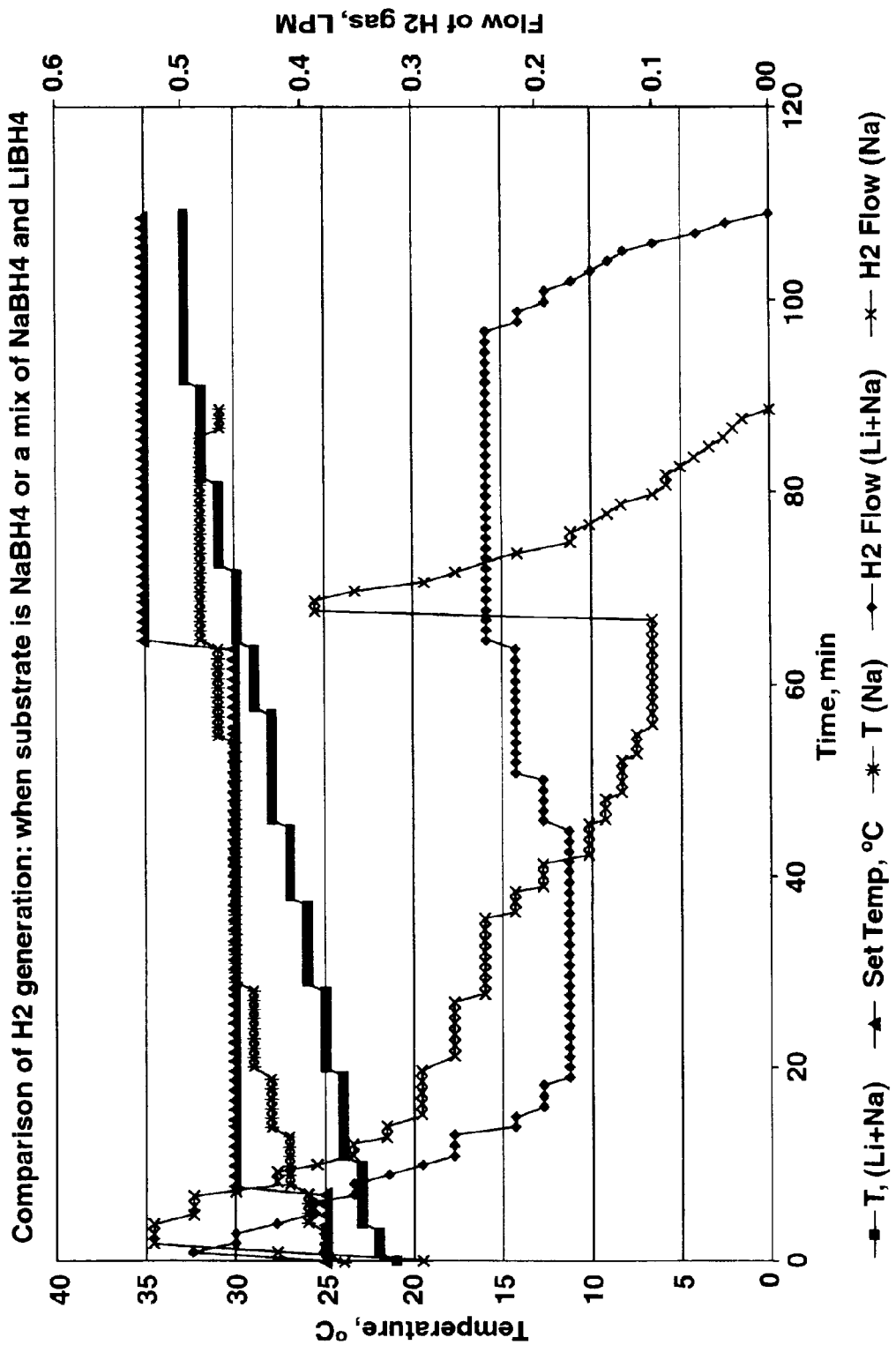
FIG. 6 is a diagram showing the comparison of two different chemical hydride solutions.

For $NaBH_4$, another additive, namely $L_iBH_4$ may be added into $NaBH_4$ solution. This lighter material has a much higher hydrogen density than $NaBH_4$. However, the by-product of $LiBH_4$ and water reaction, $LiBO_2$, only has a solubility of 5% and the reaction of $LiBH_4$4 with water is much slower than that of $NaBH_4$4 and water. This means an addition of less than 5% $LiBH_4$ to the $NaBH_4$ solution will increase the hydrogen density of the solution without causing precipitation of the said by-product and without significantly affecting its load following ability. FIG. 6 shows the comparison of $NaBH_4$ solution and $LiBH_4$—$NaBH_4$ solution. The generally lower reaction rate and slow rise in temperature indicate that the mixed solution is more stable than pure $NaBH_4$.

Figure 2:
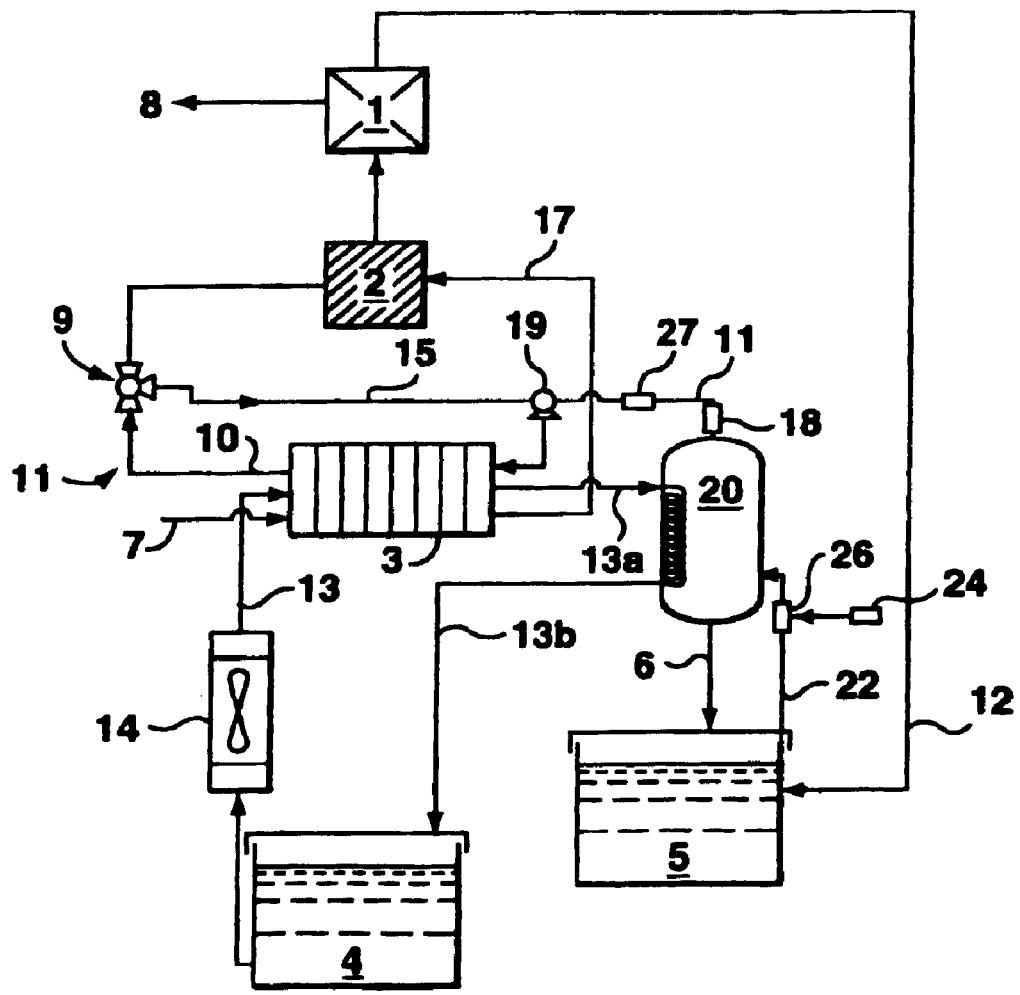
FIG. 2 is a schematic view of the second embodiment of the chemical hydride hydrogen generation system according to the present invention.

Now referring to FIG. 2, a second embodiment of the present invention is shown. In this embodiment, similar components are indicated with same reference numbers. As can be seen in FIG. 2, the chemical hydride hydrogen generation system according to the present invention combines a hydrogen generation system and a fuel cell system. The hydrogen generation system generally includes a chemical hydride storage tank 5 and a reactor 20. The fuel cell includes a fuel cell stack 3 and some peripherals, namely a coolant storage tank 4, a heat exchanger 14, a catalytic burner 2 and a water recovery unit 1. In this embodiment, the present invention is also described using $NaBH_4$ as an example of the chemical hydride used in the hydrogen generation system.

The hydrogen is generated in the reactor 20 in the same manner as that in the first embodiment. Likewise, the coolant loop is also identical to that in the first embodiment. Therefore, for simplicity and brevity, the description of the components will not be repeated.

In this embodiment, hydrogen enters the fuel cell stack 3 from the hydrogen outlet of the reactor 20. Preferably, a filter 27 is provided in the hydrogen line 11 before the hydrogen enters the fuel cell stack 3 to remove fine aerosol particles in solution, catalyst and other particles (and this filter can be included in the first embodiment of FIG. 1). As is known to those skilled in the art, a considerable portion of both air and hydrogen supplied to the fuel cell stack 3 does not react. Rather, the excess hydrogen and air leave the fuel cell stack 3 through the anode and cathode outlets thereof, respectively. Therefore, it is preferable to recirculate the excessive hydrogen back to the fuel cell stack 3 for reaction. For this purpose, a hydrogen recycle loop 15 and a catalytic burner 2 are provided in this embodiment. As shown in FIG. 2, a valve 9 and a centrifugal pump 19 are provided respectively at the two ends of the hydrogen recycle loop 15. Specifically, a centrifugal pump 19 is provided at the junction of the hydrogen recycle loop 15 and the hydrogen line 11 between the reactor 20 and fuel cell stack 3, and a valve 9 at the junction of the hydrogen recycle loop 15 and the hydrogen line 11 between the fuel cell stack 3 and the catalytic burner 2. When the fuel cell stack 3 is in operation, the pump 19 operates continuously, creating a negative pressure to ensure the hydrogen generated in the reactor 20 continuously flows from the reactor 20 to the fuel cell stack 3 via the hydrogen line 11. Excessive hydrogen flows through the anode outlet 10 of the fuel cell stack 3 to the valve 9. The said valve 9 is in a position that closes the hydrogen line 11 from the anode outlet 10 to the catalytic burner 2, thereby forcing the hydrogen to flow along the hydrogen recycle loop 15 and back to the fuel cell stack 3 for reaction by means of the pump 19. On a periodic basis, the valve 9 is turned to an open position so that the excess hydrogen flows to the catalytic burner 2. As can be seen in FIG. 2, the exhaust of the fuel cell from the cathode thereof also flows into a catalytic burner 2 along the respective line 17 thereof after leaving the fuel cell stack 3. In the catalytic burner, the hydrogen and the oxygen in the exhaust of the fuel cell react in the presence of an appropriate catalyst to form water in the known manner, i.e. $2H_2+O_2 \rightarrow 2H_2O$. Then the mixture of water and unreacted exhaust of the fuel cell flows from the catalytic burner 2 into a water recovery unit 1 which may be a gas-liquid separator. The water is separated from the mixture and circulates to the hydride storage tank 5. Recognizing that there will usually be an excess of air or hydrogen, an exhaust 8 is provided for venting residual gas into the environment from the water recovery unit 1. In practice, the opening of the valve 9 to let hydrogen flow to the catalytic burner 2 may be controlled by a controlling means, for example a timer (not shown). The opening of the valve 9 also prevents the fuel cell stack 3 from flooding due to the accumulation of water generated in the fuel cell reaction. The interval of opening valve 9 may be varied in various operation conditions and optimized by experiments.

The present invention has been described in detail in two embodiments. It should be appreciated that the chemical hydride that can be utilized in this invention includes but not limited to borohydride such as $NaBH_4$ and $LiBH_4$, other types of chemical hydrides may also be used, such as $B_2H_6$, $LiAlH_4$, $NH_3BH_3$, etc. Likewise, the fuel cell stack 3 in the present invention can be any type of fuel cell using pure hydrogen as a fuel.

It is anticipated that those having ordinary skill in the art can make various modifications to the embodiments disclosed herein after learning the teaching of the present invention. For example, the number and arrangement of components in the system might be different, different elements might be used to achieve the same specific function. However, these modifications should be considered to fall under the protection scope of the invention as defined in the following claims.

What is claimed is:

1. A chemical hydride hydrogen generation system, comprising:
   a storage means for storing a chemical hydride solution comprising a solution of chemical hydride solute in a solvent;
   a supply of the chemical hydride solution stored in the storage means;
   a reactor containing a catalyst, for catalyzing a reaction of the chemical hydride to generate hydrogen; and
   a first supplying device, connected between the storage means and the reactor, for supplying the chemical hydride solution from said storage means to said reactor so that the chemical hydride solution reacts to generate hydrogen in the presence of the catalyst and for returning the chemical hydride solution to the storage means;
   wherein the system further includes delivery means for delivering additional solvent to the chemical hydride solution, as the chemical hydride is consumed in use.

2. A chemical hydride hydrogen generation system as claimed in claim 1, wherein the chemical hydride solution is a borohydride water solution.

3. A chemical hydride hydrogen generation system as claimed in claim 1, wherein the chemical hydride solution is a water solution in which the solute is in the form of $MB_xH_y$, wherein M is a metal.

4. A chemical hydride hydrogen generation system as claimed in claim 3, wherein the solute is selected from the group consisting of: $NaBH_4$, $LiBH_4$, $KBH_4$, and $RbBH_4$.

5. A chemical hydride hydrogen generation system as claimed in claim 1, wherein the chemical hydride solution is a water solution in which the solute comprises $NaBH_4$ and $LIBH_4$ comprising less than 5% by weight.

6. A chemical hydride hydrogen generation system as claimed in claim 1, wherein the chemical hydride solution is a water solution in which the solute is $NH_3BH_3$.

7. A chemical hydride hydrogen generation system as claimed in claim 1, wherein the chemical hydride solution further includes a freezing point depressing agent.

8. A chemical hydride hydrogen generation system as claimed in claim 7, wherein the freezing point depressing agent is glycerol.

9. A chemical hydride hydrogen generation system as claimed in claim 8, wherein concentration of glycerol is less than 5% by weight.

10. A chemical hydride hydrogen generation system as claimed in claim 9, wherein concentration of glycerol is 1% by weight.

11. A chemical hydride hydrogen generation system as claimed in claim 1, wherein the chemical hydride solution further includes alkaline additives.

12. A chemical hydride hydrogen generation system as claimed in claim 11, wherein the alkaline additive is selected from the group consisting of LiOH, KOH, and NaOH.

13. A chemical hydride hydrogen generation system as claimed in claim 11, wherein the alkaline additive is 0.1% NaOH by weight.

14. A chemical hydride hydrogen generation system comprising:
   a storage means for storing a chemical hydride solution comprising a solution of chemical hydride solute in a solvent;
   a supply of the chemical hydride solution stored in the storage means;

a reactor containing a catalyst, for catalyzing a reaction of the chemical hydride to generate hydrogen; and a first supplying device, connected between the storage means and the reactor, for supplying the chemical hydride solution from said storage means to said reactor so that the chemical hydride solution reacts to generate hydrogen in the presence of the catalyst;

a return line for the solution between the storage means and the reactor, and a flow control device that operatively stops said first supplying device when the hydrogen pressure in the said reactor reaches a first value and activates the said first supplying device when the hydrogen pressure in the said reactor falls to a second value lower than the first value.

15. A chemical hydride hydrogen generation system as claimed in any of the preceding claims, wherein the system further includes a heat exchanger for the said reactor capable of, separately, removing heat from the said reactor and supplying heat to said reactor.

16. A chemical hydride hydrogen generation system as claimed in claim 1, including a recovery means for connection to a fuel cell for recovering water generated in the fuel cell and further including a gas-water separator.

17. A chemical hydride hydrogen generation system as claimed in claim 16, wherein the said recovery means further includes a catalytic burner for connection to the fuel cell and the gas-water separator, and wherein said catalytic burner includes inlets for connection to outlets of the fuel cell for excess oxidant and hydrogen so as to bring unreacted hydrogen and oxygen in exhaust gas from the said fuel cell into reaction to form water.

18. A chemical hydride hydrogen generation system as claimed in claim 17, including a first valve for connection to the outlet of the fuel cell for excess hydrogen, and to the catalytic burner and to a hydrogen recycle line for connection to an inlet of the fuel cell, selectively allowing excess hydrogen leaving the fuel cell after reaction to be circulated back to the said fuel cell in a first mode and allowing the hydrogen to be supplied to the catalytic burner from the said fuel cell in a second mode.

19. A chemical hydride hydrogen generation system as claimed in claim 18, wherein the said system further includes a first control means that operatively switches the first valve between the first and second modes.

20. A chemical hydride hydrogen generation system as claimed in any of the claims 16 to 19, further including a filtering means connected to the reactor for purifying the hydrogen generated in the said reactor before the hydrogen is supplied to the fuel cell.

21. A chemical hydride hydrogen generation system as claimed in any of the claims 16 to 19, wherein the system further includes a second control means that operatively stops the first supplying device when the hydrogen pressure in the reactor reaches a first value and activates the first supplying device when the hydrogen pressure in the reactor falls to a second value lower than the first value.

22. A chemical hydride hydrogen generation system as claimed in any of the claims 16 to 19, wherein the system further includes a heat exchanging means for the reactor that selectively removes heat from the said reactor and heats up the reactor to control the hydrogen generation reaction.

* * * * *